(12) United States Patent
Morita et al.

(10) Patent No.: US 11,117,059 B2
(45) Date of Patent: Sep. 14, 2021

(54) NON-TRANSITORY COMPUTER READABLE MEDIA, INFORMATION PROCESSING DEVICE, AND CONTROL METHOD

(71) Applicant: GREE, Inc., Minato-ku (JP)

(72) Inventors: Sohei Morita, Minato-ku (JP); Isamu Hosoya, Minato-ku (JP); Yoshihiko Ozaki, Minato-ku (JP)

(73) Assignee: GREE, Inc., Minato-ku (JP)

( * ) Notice: Subject to any disclaimer, the term of this patent is extended or adjusted under 35 U.S.C. 154(b) by 0 days.

(21) Appl. No.: 16/546,515

(22) Filed: Aug. 21, 2019

(65) Prior Publication Data
US 2020/0061479 A1    Feb. 27, 2020

(30) Foreign Application Priority Data

Aug. 21, 2018  (JP) .............................. JP2018-154672
Aug. 13, 2019  (JP) .............................. JP2019-148444

(51) Int. Cl.
*A63F 13/95*    (2014.01)
*A63F 13/77*    (2014.01)
(Continued)

(52) U.S. Cl.
CPC .............. *A63F 13/95* (2014.09); *A63F 13/35* (2014.09); *A63F 13/77* (2014.09); *A63F 13/80* (2014.09);
(Continued)

(58) Field of Classification Search
None
See application file for complete search history.

(56) References Cited

U.S. PATENT DOCUMENTS 9,498,719 B2     11/2016  Takeuchi
2014/0235354 A1*  8/2014  Takeuchi .............. A63F 13/795
                                                            463/42
(Continued)

FOREIGN PATENT DOCUMENTS

JP           8-30804 A       2/1996
JP        2014-195611 A     10/2014

OTHER PUBLICATIONS

Notice of Reasons for Refusal dated Jul. 21, 2020 in Japanese Patent Application No. 2019-148444 (with English language translation), 7 pages.
(Continued)

*Primary Examiner* — James S. McClellan
*Assistant Examiner* — Peter J Iannuzzi
(74) *Attorney, Agent, or Firm* — Entralta P.C.; Marc K. Weinstein; Peter D. Weinstein (57) ABSTRACT

The program stored in the non-transitory computer readable media causes the information processing device to execute a setting processing in which one or more parameters are set with respect to game content appearing in a game, and execute a simulation processing related to a predetermined battle game part using the game content, for which the one or more parameters are set by the setting processing, and user data that includes information on one of more of the game content set by the user playing the game, wherein optimal solutions for the one or more parameters are derived by repeatedly executing the simulation processing while changing (adjusting) the one or more parameters by the setting processing by way of an optimization problem that minimizes the difference between evaluation information retrieved based on the execution of the simulation process and target evaluation information.

15 Claims, 5 Drawing Sheets

(51) Int. Cl.
    *A63F 13/35*         (2014.01)
    *A63F 13/80*         (2014.01)

(52) U.S. Cl.
    CPC . *A63F 2300/206* (2013.01); *A63F 2300/5533* (2013.01); *A63F 2300/80* (2013.01)

(56) References Cited

U.S. PATENT DOCUMENTS

| | | | | |
|---|---|---|---|---|
| 2014/0243096 | A1* | 8/2014 | Takeuchi | A63F 13/822 |
| | | | | 463/42 |
| 2017/0136362 | A1* | 5/2017 | Bucher | A63F 13/79 |
| 2018/0280799 | A1* | 10/2018 | Ichijo | A63F 13/35 |

OTHER PUBLICATIONS

Satoshi Yoneda, "[CEDEC 2017] Game Quality management of the time of the game shall be borne by the AI!?" 4Gamer.net, Retrieved from the Internet [URL: https://www.4gamer.net/games/328/G032883/20170902004/], Sep. 2, 2017, 11 pages.

Office Action dated Jan. 12, 2021 in corresponding Japanese Patent Application No. 2019-148444 with English translation (8 pages).

Kazuko Manabe; Game balance adjustment using artificial intelligence by genetic algorithm, HP [online], Sep. 1, 2017 [search on Dec. 18, 2020], URL http://www.jp.square / enix.com/tech/library/pdf/cedec2017_manabe.pdf (60 pages).

* cited by examiner

| Character ID | Character Name | HP | MP | Attack Power | Defense Power | Magical Power | Agility | Dexterity | Equipment ID |
|---|---|---|---|---|---|---|---|---|---|
| ⋮ | ⋮ | ⋮ | ⋮ | ⋮ | ⋮ | ⋮ | ⋮ | ⋮ | ⋮ |

FIG. 4

| Character ID | ... | Skill 1 | Skill 2 | Skill 3 | Special Move | Assist Skill |
|---|---|---|---|---|---|---|
| ⋮ | ⋮ | ⋮ | ⋮ | ⋮ | ⋮ | ⋮ |

FIG. 5

| Equipment ID | Equipment Name | Attack Power | Defense Power | Magical Power | Characteristics |
|---|---|---|---|---|---|
| ⋮ | ⋮ | ⋮ | ⋮ | ⋮ | ⋮ |

FIG. 6

| User ID | Deck ID | Party Characters | | | | | | Assist Character | | | | | | Tactics | Special Move Pattern |
|---|---|---|---|---|---|---|---|---|---|---|---|---|---|---|---|
| | | 1 | 2 | 3 | 4 | 5 | 6 | 1 | 2 | 3 | 4 | 5 | 6 | | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

|  | Parameter Names | | | | Difference in Evaluation Information |
|---|---|---|---|---|---|
|  | Parameter 1 | Parameter 2 | Parameter 3 | Parameter 4 | |
| Initial Value | ... | ... | ... | ... | ... |
| 1st Round | ... | ... | ... | ... | ... |
| 2st Round | ... | ... | ... | ... | ... |
| 3st Round | ... | ... | ... | ... | ... |
| 4st Round | ... | ... | ... | ... | ... |
| 5st Round | ... | ... | ... | ... | ... |
| 6st Round | ... | ... | ... | ... | ... |
| 7st Round | ... | ... | ... | ... | ... |
| 8st Round | ... | ... | ... | ... | ... |
| 9st Round | ... | ... | ... | ... | ... |
| 10st Round | ... | ... | ... | ... | ... |

NON-TRANSITORY COMPUTER READABLE MEDIA, INFORMATION PROCESSING DEVICE, AND CONTROL METHOD

CROSS-REFERENCE TO RELATED APPLICATIONS

This application claims the benefit of priority based on Japanese Patent Application No. 2019-148444, which is a prior application filed on Aug. 13, 2019, the entire contents of which are incorporated herein by reference.

FIELD

The present disclosure relates to non-transitory computer readable media, an information processing device, and a control method.

BACKGROUND

Game systems in which an ally character and an enemy character battle one another is known (Patent Document 1). In the game system described in Patent Document 1, a user organizes a deck which includes a plurality of characters by selecting a plurality of ally characters, and competes against enemy characters and other users' decks using the organized deck.

[Patent Document 1] Japanese Patent Application Laid-Open No. 2014-195611

Incidentally, in a game in which characters battle each other, appropriately adjusting the strength of characters appearing in the game in consideration of the game balance is important. Generally, the strength of a character is determined by adjusting parameters such as the attack power set for the character. However, in the case of a game in which a large number of characters appear, such as with a role playing game, manually adjusting the parameters set for each individual character is difficult for game designers. In addition, in the case of games in which new characters are successively implemented, such as with online games, adjusting parameters set for the new characters in consideration of the strengths of the many existing characters is useful.

SUMMARY

According to one aspect, a non-transitory computer readable media is provided for storing a program for causing a computer to execute a processing, wherein the processing comprises, executing a setting processing in which one or more parameters are set with respect to game content appearing in a game, and executing a simulation processing related to a predetermined battle game part using the game content, for which the one or more parameters are set by the setting processing, and user data that includes information on one of more of the game content set by the user playing the game, wherein optimal solutions for the one or more parameters are derived by repeatedly executing the simulation processing while changing the one or more parameters by the setting processing by way of an optimization problem that minimizes the difference between evaluation information retrieved based on the execution of the simulation process and target evaluation information.

DESCRIPTION OF EMBODIMENTS

System Overview

Figure 1:
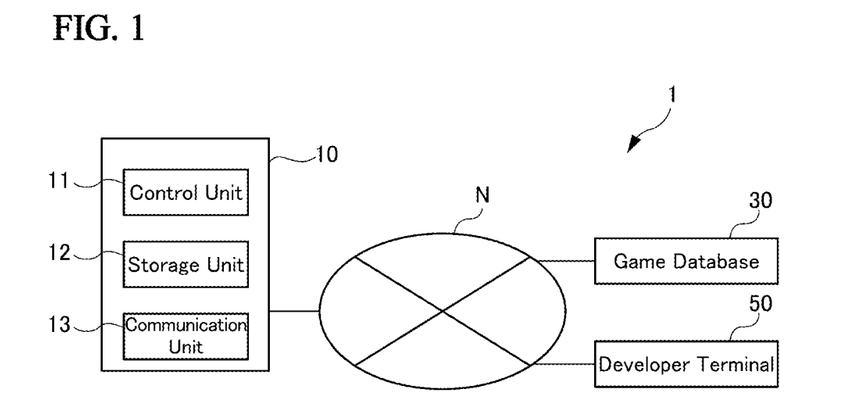
FIG. 1 is a diagram schematically showing the overall configuration of a system including an information processing device (server device) according to an embodiment.

As shown in FIG. 1, the system 1 includes a server device 10, a game database 30 communicably connected to the server device 10, and a developer terminal 50 communicably connected to the server device 10. The system 1 is a system for designing game content to be newly introduced in a game executed by a game system (not shown), and is able to obtain optimum values for parameters to be set for a new game content.

Here, the game content indicates a game object for which parameters can be set, and includes any game content appearing in a game such as an ally character, an enemy character, a deck containing a plurality of characters, equipment for characters such as weapons and protective equipment, items for recovery, objects such as buildings and obstacles, and virtual areas such as dangerous zones defined in the game space. Further, the parameters indicate the status for specifying the magnitude of the performance of the game content; for example, if the game content is a character, offensive power, defensive power, skill power, skill activation rate, or the like may be included; if the game content is a deck, a combination of characters included in the deck or the like may be included; if the game content is equipment, offensive power, defensive power, durability value, or the like may be included; if the game content is an item, resilience or the like may be included; if the game content is an object such as a building or an obstacle, durability values or the like may be included; and if the game content is a virtual area such as a dangerous zone damage to be imparted over time or the like may be included. That is, in cases where the statuses referenced in a battle game or the level of difficulty related to the progress in the game need to be determined, the parameters may include defined statuses or the like.

The game executed in the target game system is, for example, a game including a predetermined battle game part in which characters equipped with various equipment battle each other, and parameters indicating the performance of each game content (character, deck, and character equipment) appearing in this game are set. Note that, the battle game part may be a battle between a deck which includes a plurality of characters and an enemy character appearing in the game, or a plurality of decks may be played against each other.

First, the system 1 sets initial parameters for a new game content that appears in the game. The setting of the initial parameters for the new game content is performed based on the master data created by the developer terminal 50, which will be described later.

Next, the system 1 executes a simulation processing related to the battle game part using the new game content in which the initial parameters are set and the existing game content. The information of the existing game content is retrieved from user data stored in the game database 30, which will be described later. Here, the simulation processing related to the battle game part indicates a process of executing the battle game part one or more times in a simulated and automatic manner, and for example, when a user operation is required in the battle game part, the battle game part is executed by using alternative operation information generated by a predetermined algorithm.

Next, the system 1 retrieves evaluation information based on the execution of the simulation processing. Here, the evaluation information indicates information related to the evaluation of a new game content in which parameters are set, and may include, for example, the winning percentage obtained by playing a new game content against a specific existing game content multiple times, battle results obtained by playing the deck against each of a plurality of decks configured by existing game content when the new game content is a new deck, or a distribution of damage received from each of the existing game content obtained by playing a new game content against each of a plurality of existing game content.

Then, the system 1 uses the evaluation information as an objective function, and an optimal solution for the parameters is obtained by solving an optimization problem using the parameters set for the new game content as a variable. That is, the system 1 obtains the optimal solution of the parameters by alternately and repeatedly executing the setting processing and the simulation processing while adjusting the parameters as an optimization problem for minimizing the difference between the evaluation information and the preset target evaluation information.

System Configuration

The server device 10 is an information processing device for deriving an optimal solution for parameters set in a game content, and is connected to the game database 30 and the developer terminal 50 via the network N. As shown in FIG. 1, the server device 10 includes a control unit 11 for executing various calculations, a storage unit 12 for storing various programs and data, and a communication unit 13 for transmitting and receiving data to and from other devices.

The game database 30 is a storage device that stores data related to a game executed by a game system (not shown), and stores user data including information on existing game content belonging to a user playing the game and information on game content set by the user. Here, the information on the game content set by the user indicates the information on the game content in which in which the user sets the role in the game from among the game content belonging to the user, and includes, for example, equipment information set for the character, information on the plurality of characters set in the deck, or the like. Necessary data including user data is copied from the database of the game system to the game database 30. Further, the server device 10 retrieves user data stored in the game database 30 when executing the optimization processing.

The developer terminal 50 is an information processing device for a game designer who is a developer designing a game content. When the optimization processing is executed in the server device 10, the developer terminal 50 transmits to the server device 10 master data including information on a new game content designed by a game designer and target evaluation information used in the optimization processing. As described above, the master data includes data for setting initial parameters for a new game content.

Functional Configuration of Server Device

Figure 2:
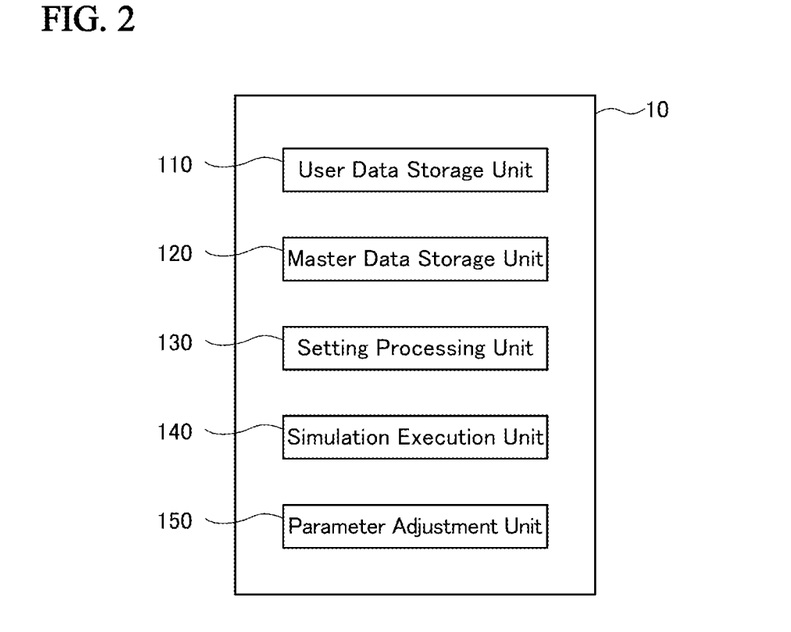
FIG. 2 is a diagram showing a functional configuration of the server device of the system of FIG. 1.

As shown in FIG. 2, the server device 10 is provided with a user data storage unit 110 that stores user data retrieved from the game database 30, a master data storage unit 120 that stores master data retrieved from the developer terminal 50, a setting processing unit 130 that performs a setting processing for setting parameters in a new game content, a simulation execution unit 140 that executes a simulation processing related to a battle game part using a new game content and existing game content, and a parameter adjustment unit 150 that adjusts parameters to be set in a new game content. Each of these functions is realized by the control unit 11 that operates based on a program stored in the storage unit 12. The server device 10 is configured to perform an optimization processing in which a setting processing and a simulation processing are alternately and repeatedly performed while adjusting parameters to be set for a new game content.

The user data storage unit 110 stores the user data retrieved from the game database 30 in the storage unit 12. The user data includes information about existing game content of a user who is playing a game for which a new game content is to be implemented, and information on existing game content set by the user.

The master data storage unit 120 stores the master data retrieved from the developer terminal 50 in the storage unit 12. The master data includes information on a new game content, data for setting initial parameters on new game content, and target evaluation information used for optimization processing.

The setting processing unit 130 performs a setting processing for setting parameters in a new game content. The setting processing unit 130 executes the setting processing a plurality of times during the execution of the optimization processing. Specifically, the setting processing unit 130 sets initial parameters for a new game content based on the master data at the time of the initial setting processing, and in the second and subsequent setting processings, the setting processing is performed so that the parameters set in the new game content are replaced with the adjusted parameters.

The simulation execution unit 140 executes a simulation processing related to the battle game part using the new game content whose parameters are set by the setting processing and the existing game content specified by the user data. In the simulation processing, as described above, the battle game part is executed one or more times in a simulated and automatic manner. The simulation execution unit 140 executes the simulation processing a plurality of times during the execution of the optimization processing. Specifically, the simulation execution unit 140 executes a simulation processing every time a parameter is set in a new game content by the setting processing unit 130.

The parameter adjusting unit 150 adjusts parameters to be set in a new game content. More specifically, the parameter adjustment unit 150 retrieves evaluation information as an objective function from the execution result of the simulation processing each time the simulation processing is executed by the simulation execution unit 140, and determines a parameter (adjusted parameter) to be reset to a new game content as a variable of an optimization problem that minimizes the difference between the evaluation information and target evaluation information predetermined by the game designer. A known algorithm can be used as the algorithm used for parameter adjustment, but if the simulation processing itself is a black box function, an algorithm based on the gradient method cannot be used. Therefore, for example, an algorithm can be selected depending on the parameters to be optimized, such as random search, grid search, genetic algorithm optimization, Bayesian optimization, etc. In addition, with respect to adjusting parameters, constraint conditions such as limiting the search range of the parameters can be imposed. Note that there may be a plurality of optimal solutions for the parameters that satisfy the target evaluation information as determined in advance by the game designer, but any of the parameters may also be derived. However, if there are a plurality of optimal solutions, an optimal solution is preferably selected in which all parameters are as close as possible to the center of the parameter search range (constraint conditions). Also, if an optimal solution for the parameters satisfying the target evaluation information cannot be obtained, a notification may be issued, and the optimization processing may be terminated.

In the optimization processing, various devisings can be added in order to reduce the number of times the simulation processing is executed and to obtain an optimal solution of the parameters in a short time. For example, a search space can be gradually narrowed based on previous search results such as by using experimental designs, etc. Also, for example, the search space may be narrowed by means of a pinching equation in which a new game content is stronger than a specific existing game content and weaker than another specific existing game content. As another example, the search space may be narrowed without worrying about local solutions by using only linear parameters as the parameters to be set in the new game content. Note that the parameters may be normalized (transformed from 0 to 1) before performing the search.

Game Database

Figure 3:
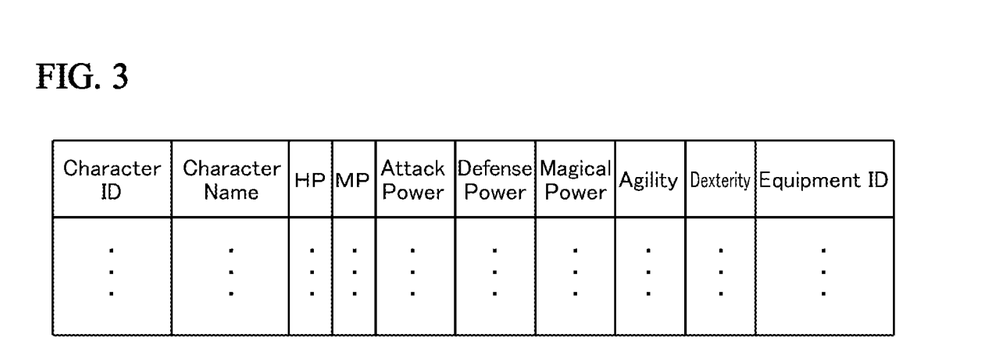
FIG. 3 is a diagram showing an example of character data belonging to a user stored in a game database of the system of FIG. 1.

Here, character data and equipment data belonging to the user are shown as examples of information on the existing game content belonging to a user included in the user data stored in the game database 30. As shown in FIG. 3, in addition to the character ID for identifying the character and the character name indicating the name of the character, the character is associated with parameters such as HP (hit point), MP (magic point), attack power, defense power, magical power which shows attack power done by magic, agility to determine the order of action in the battle, and dexterity which affects the occurrence rate of critical attacks. These parameters are subject to adjustment when one or more new characters are added. Also, the character can also be equipped with equipment, and the character is further associated with an equipment ID of the equipment able to be mounted on the character.

Figure 4:
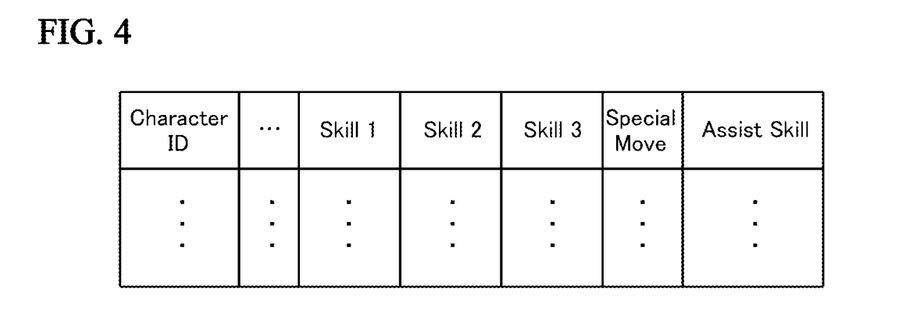
FIG. 4 is a diagram showing a continuation of the data of FIG. 3.

Also, as shown in FIG. 4, the character has further associated parameters which include three skills (Skill 1, Skill 2, and Skill 3) that the character can invoke during a battle, a special move that can be invoked if a predetermined condition is satisfied during the battle, and an assisting skill that can be invoked at the start of a battle if the character is set as an assisting character of another character. These parameters are also subject to adjustment when a new character is added. For example, assuming that an ability is determined by at least one of the powers (attack power or defense power), activation rate, and duration (duration of an abnormal state such as poisoning or sleep) of the skills, if the skill set for the character is to be adjusted, an optimal solution for at least one of the powers, activation rate, and duration is required. Note that parameters other than these may also be associated with the character.

Figure 5:
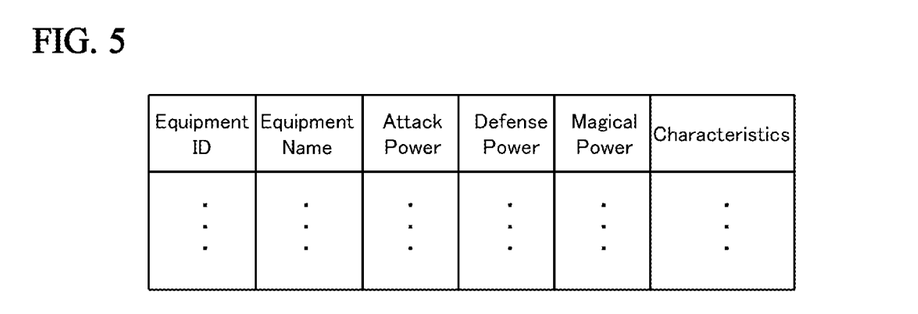
FIG. 5 is a diagram showing an example of user-owned equipment data stored in the game database of the system of FIG. 1.

As shown in FIG. 5, in addition to the equipment ID that identifies the equipment and the equipment name indicating the name of the equipment, the equipment can also be associated with parameters such as attack power, defense power, magical power, and other characteristics indicating effects of the equipment that can be activated. These parameters are subject to adjustment when adding new equipment. When the equipment is attached to the character, parameter settings are configured to be added or supplemented to the corresponding parameters of the character. Note that parameters other than these may be associated with the equipment.

Figure 6:
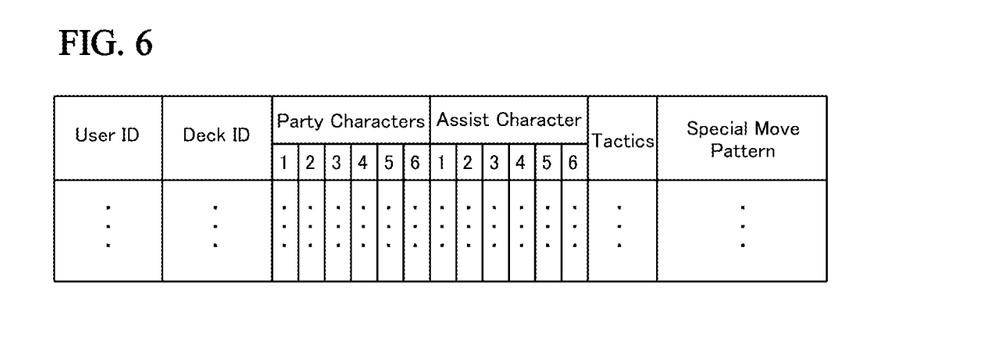
FIG. 6 is a diagram showing an example of deck setting data for each user stored in the game database of the system of FIG. 1.

Moreover, deck setting data for each user is shown as an example of the information of the game content set by a user which is included in the user data stored in the game database 30. As shown in FIG. 6, six characters (1 to 6) set as party characters and six characters (1 to 6) set as assist characters are associated with the user in addition to a user ID for identifying the user and a deck ID for identifying the deck set by the user. That is, a combination of these characters is associated with the deck as a parameter. Therefore, these parameters are subject to adjustment when a new deck is added. Note that the assist characters can be associated with one party character at a time, and the set parameters are added or supplemented to the corresponding parameters of the party character, as well as configured so as to be able to activate the assistance skill. In addition, the user is further associated with an operation for specifying a character's action policy when the battle is automatically advanced, and a special move pattern for specifying a usage policy of the special move when the battle is automatically advanced.

Battle Game Part

Figure 7:
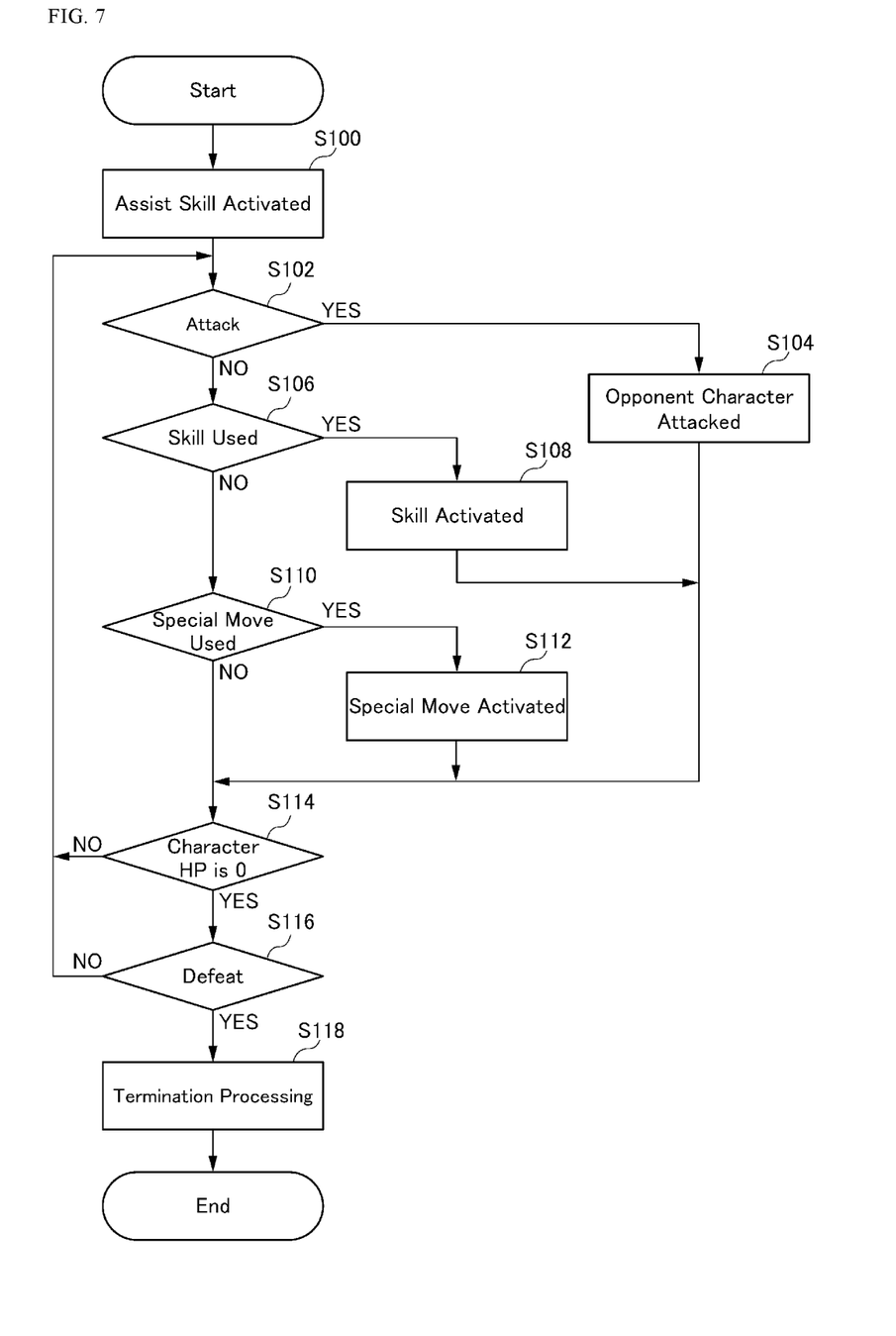
FIG. 7 is a flowchart showing an example of a battle game part.

A battle game part of a game executed in a target game system will be described. FIG. 7 is a flowchart showing an example of the battle game part. The battle game part is a battle between decks, and the party characters (six characters) set in each deck battle each other. Note that this battle game part is substantially the same as the battle game part executed one or more times in the simulation processing in the simulation execution unit 140.

When the battle starts, any one of the six assist characters set in each of the decks is selected, and the assist skills of the selected assist character are activated (S100). Assist skills are activated for each deck. Thereafter, the battle proceeds on a turn basis, and all the characters act in accordance with an action order determined by the set agility. If the character action arriving next in the action order is an attack (S102Yes), the character attacks the opponent character with the set attack power (S104). The HP of the attacked character decreases by a calculated damage amount which is calculated based on the attack power of the attacking character and the defense power of the attacked character. If the character action arriving next in the action order uses a skill (S106Yes), the character activates the set skill (S108). For example, if the skill to be launched is attack magic, the character attacks the opponent character in accordance with the set magical power and the set skill power. If the special move condition(s) is satisfied during the battle and the use of the special move is specified as the action of the character (S110Yes), the character activates the set special move (S112). Then, if any of the HPs of the characters participating in the battle becomes 0 (S114Yes), that character is excluded from the battle. Also, if all the characters set on any deck are excluded from the battle, i.e., if all of the characters on any deck are defeated (S116Yes), a termination processing such as the tallying of the battle scores is executed (S118), and the battle game part ends.

Server Device Operation

Figure 8:
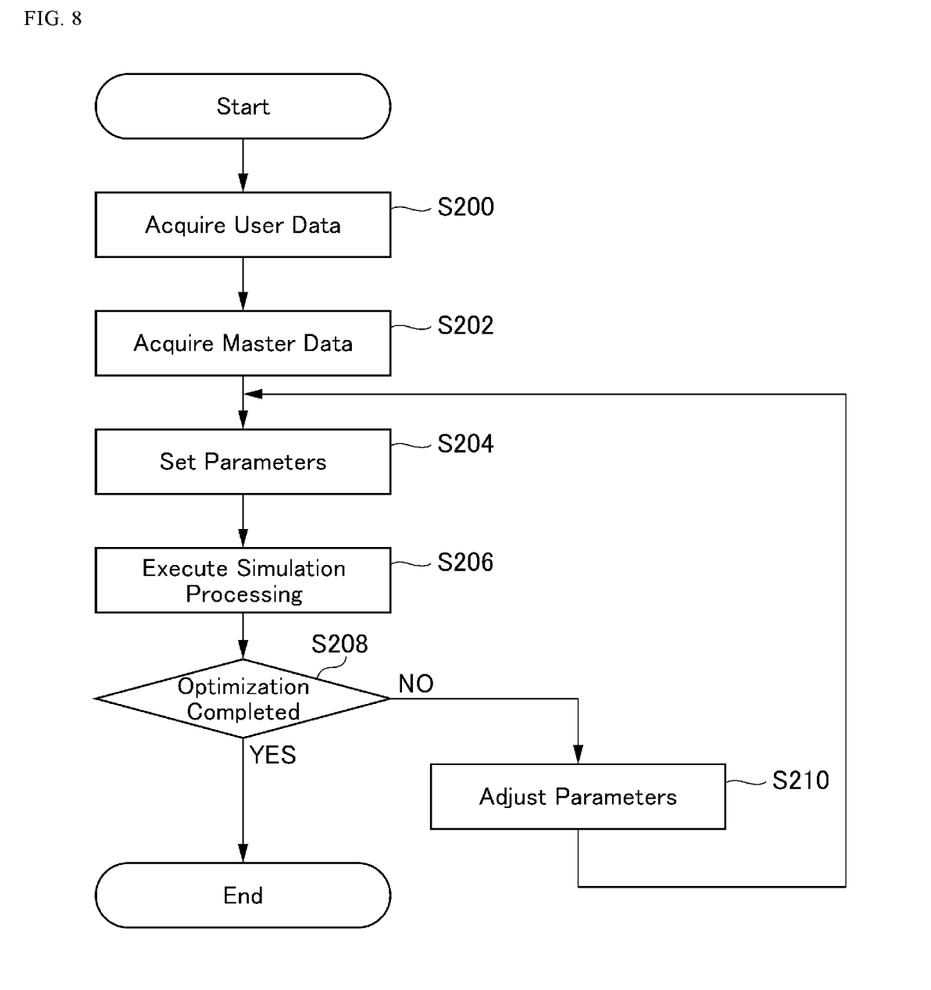
FIG. 8 is a flowchart showing an example of an optimization processing in the server device of FIG. 2.

Next, an operation flow of the server device 10 will be described. FIG. 8 is a flowchart showing an example of an optimization processing in the server device 10.

The server device 10 retrieves user data from the game database 30 and stores the retrieved user data in the storage unit 12 (S200). This user data includes information on existing game content belonging to a user who is playing a game to be installed on a new game content and information on existing game content set by the user.

Next, the server device 10 retrieves the master data from the developer terminal 50 and stores the master data in the storage unit 12 (S202). The master data includes information of a new game content, information for setting initial parameters in the game content, and target evaluation information.

After acquiring the master data, the server device 10 sets the initial parameters in the new game content based on the master data (S204). For example, if the new game content is a character and the parameter set for the character is a skill, the server device 10 sets the character to a skill having a predetermined power, activation rate, and duration which were predetermined by the game designer.

Next, the server device 10 executes a simulation processing for the battle game part using the new game content in which the initial parameters are set and the existing game content specified by the user data (S206). For example, the server device 10 executes a simulation processing in which a deck which includes the aforementioned new character and the existing characters and a specific deck which includes only existing characters battle multiple times.

When execution of the simulation processing is completed, the server device 10 retrieves evaluation information as objective functions from the execution result of the simulation processing, calculates a difference between the evaluation information and the target evaluation information included in the master data, and determines whether or not the optimization has been completed based on the difference (S208). If the server device 10 determines that the optimization of the parameters is completed (S208YES), the optimization processing is completed. This determination is affirmed when the difference is minimized and an optimal solution for the parameters is obtained, but may also be affirmed if a predetermined amount of time has elapsed since the start of the optimization processing or if the simulation processing has been executed a predetermined number of times or more since the start of the optimization processing. For example, the server device 10 retrieves the battle win rate on the deck side which includes the new character as evaluation information from the execution result of the simulation processing in which the aforementioned decks have battled each other a plurality of times, calculates the difference between the battle win rate and the target battle win rate (target evaluation information) set by the game designer, and determines whether or not the difference is minimal.

If the server device 10 determines that the optimization of the parameters has not been completed (S208NO), the server device adjusts the parameters to be set for a new game content so that the difference between the evaluation information and the target evaluation information becomes minimal (S210). For example, if the battle win rate on the deck side including the new character is lower than the target battle win rate, the server device 10 adjusts the power, the activation rate, and the duration of the skill to improve the performance of the new game content so that the battle win rate of the deck side including the new character is increased, and if the battle win rate of the deck side including the new character is higher than the target battle win rate, adjusts the power, the activation rate, and the duration of the skill to reduce the performance of the new game content so that the battle win rate of the deck side including the new character is decreased.

Once the parameters for setting a new game content have been adjusted, the process returns to S204 and the server device 10 sets the parameters so that the parameters set for the new game content are replaced by the adjusted parameters. Thereafter, the server device 10 repeats these processes until the optimization of the parameters is completed.

Other Embodiments

The present invention is not limited to the above embodiment.

For example, the values of the adjusted parameters obtained at any stage in the optimization processing (FIG. 8) can be used.

Specifically, even if the server device 10 determines that the optimization of the parameters has not been completed (S208NO), the server device may store the values of the relevant parameters, i.e., the value of the parameters (S204) that were set prior to the simulation processing (S206). In this case, the server device 10 may store the value of the relevant parameters each time the optimization processing (S204~S206) is repeated until a determination is reached that the optimization of the parameters has been completed (S208YES), or may store only the value of the parameters that satisfies any predetermined conditions. The values of these parameters can be stored in, for example, the developer terminal 50 or the storage unit 12 of the server device 10.

Figure 9:
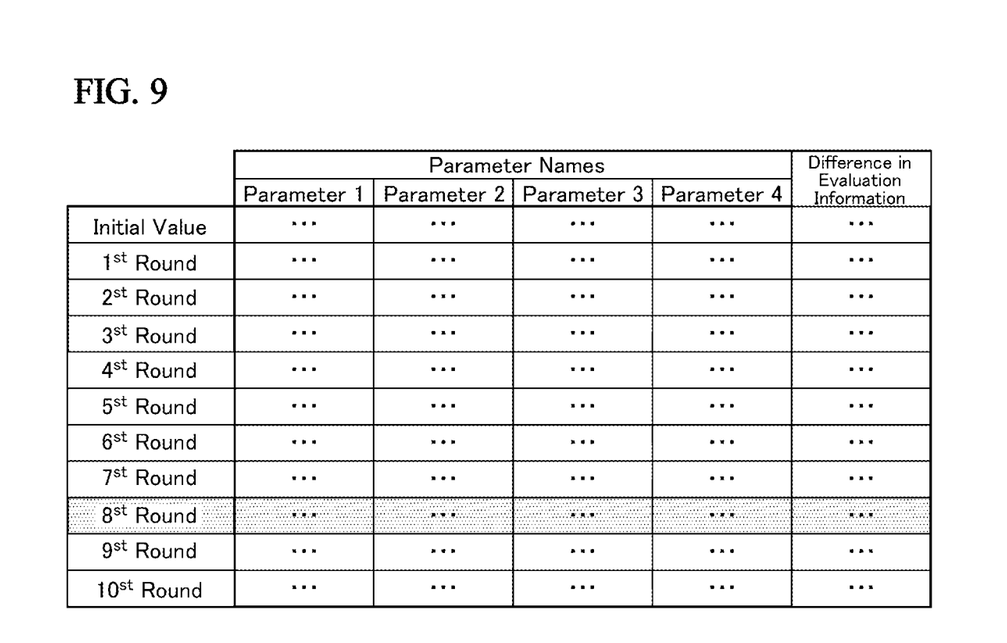
FIG. 9 is a diagram showing an example of data storing parameter values that are adjusted each time a simulation processing is executed.

FIG. 9 is a diagram showing examples of data storing parameter values adjusted each time the simulation processing is executed (S206). FIG. 9 shows an example in which four parameters are to be optimized whose "Parameter Names" are "Parameter 1" to "Parameter 4", and the optimization processing (S204~S206) is repeated ten times. The "Difference in Evaluation Information" in FIG. 9 is the difference between the evaluation information obtained from the execution result of the simulation processing and the target evaluation information included in the master data. This example includes not only the case in which the server device 10 determines that the optimization of the parameters has been completed (S208YES) in accordance with the 10 rounds of the optimization processing (S204~S206), but also the case where the server device 10 determines that the optimization of the parameters has not been completed until the end even if the optimization processing (S204~S206) is repeated ten times (S208NO).

As shown in FIG. 9, the initial values of Parameter 1 to Parameter 4 are adjusted by the first round optimization processing (S204~S206), and the "Initial Value" is updated to the "First Round". Thereafter, the values of Parameter 1 to Parameter 4 are similarly determined by the N-th (N=2 to 10) optimization processing (S204 to S206) by updating from the "N−1" value to the "N-th" value.

The game designer may select any of the stored parameter values (FIG. 9). For example, the value of the "8th Round" can be selected as the values of the parameters to be set in the game content, and the value of these parameters can then actually be set in the game content.

Further, for example, the value of any adjusted parameter may be used as an initial value, and the optimization processing (S204~S206) may be repeated only in the vicinity of the initial value, thereby optimizing the value of the parameter in the vicinity of the initial value.

As a further example, machine learning is able to performed by inputting the value of the selected parameters as sample data, and information that the game designer personally has not recognized is able to be extracted, such as a law or a balance indicated by the value of the selected parameter. The extracted information can also be used when constructing an algorithm or the like for setting the value of a parameter.

Evolutionary optimization techniques, such as genetic algorithms, may also be applied to the values of the selected parameters. In this case, for example, the first generation (seed or initial value) is a set of parameter value sets that approximate the value of the selected parameter, and the optimal solution can be searched for by repeating the process of obtaining the next generation (solution) by an operation such as a crossover or mutation.

In this manner, the parameter values that cannot be extracted by only repeating the optimization processing (S204 to S206) are able to be set in the game content by using the parameter values selected from the parameter values adjusted by the optimization processing (S204 to S206) to obtain the parameter values that are finally set in the game content. For example, reflecting the evaluation of the game designer from a viewpoint different from the target evaluation information (objective function) is possible in the parameter values set. Therefore, the parameter values can be strictly set based on various evaluation perspectives. In addition, providing the game designer(s) with new knowledge of the parameters to be set in the game content is also possible. Further, if the values of the parameters do not converge only by the optimization processing (S204~S206), the difference may not be sufficiently small between the evaluation information obtained from the results of executing the simulation processing and the target evaluation information included in the master data. In such cases, the difference can be made closer to zero by appropriately utilizing the parameter values selected from the values of the parameters adjusted by the optimization processing (S204~S206). This makes setting the parameter values more strictly possible.

Also, the parameters to be adjusted and the target evaluation information are not limited to those exemplified in the above embodiments.

For example, if a character is selected as a new game content and a deck is configured to include the character and existing characters, the combination of characters included in the deck are the parameters to be adjusted, and the parameters may be adjusted with the target evaluation information that the deck including the character is the stronger deck compared to the deck including only the existing characters. The simulation processing in this case may be a battle between these decks or a battle between these decks and a predetermined enemy character (boss character). The algorithm used for parameter adjustment may be, for example, an evolutionary optimization method such as the aforementioned genetic algorithm. In order to search efficiently, the existing strongest party (user data) may also be used as a seed (initial value) of the genetic algorithm.

Further, for example, if selecting an enemy character (boss character) to appear in a game event as a new game content, the power, activation rate, and duration of the skill setting for the enemy character are the parameters to be adjusted, and the parameters may be adjusted using the distribution of damage received from each deck obtained by making the enemy character battle with each of a plurality of decks including only existing characters as target evaluation information. Constraints may be imposed to limit the maximum range of damage. If the enemy character and the deck set by the upper user group are played against each other, the simulation processing in this case is preferable for optimizing the game balance of the game event. In addition, since the relationship between the parameters and the distribution of the damage is not linear, using a parameter search method by Bayesian optimization capable of efficiently finding a global optimal solution is preferable, for example, as an algorithm used for parameter adjustment.

Moreover, the target to be optimized is not limited to the numerical values such as the various parameters described above (for example, parameters related to the character). For example, setting a character's lines (another example of a parameter) is possible based on a game scene. In this case, existing character lines, user comments, or the like can be used as teacher information through known natural language processing methods, and can be optimized by using the present invention. In this case, the target evaluation information may be set so that there is no scenario that cannot be followed on the game scenario. For example, if the game specification is such that the route followed by the branch on the game scenario differs depending on the character's lines, etc., there may be difficulties (bugs) such as inconsistencies in the story and failure to reach the desired ending. The target evaluation information may be set so as to substantially eliminate the possibility of such difficulties.

In the embodiments described above, the system 1 includes the server device 10, the game database 30, and the developer terminal 50, but the configuration of the system 1 is not limited to this. For example, a single information processing device which includes all of the components included in the system 1 may be employed. In addition, the configuration included in the system 1 can be appropriately assigned to the server device or the developer terminal.

Figure 10:
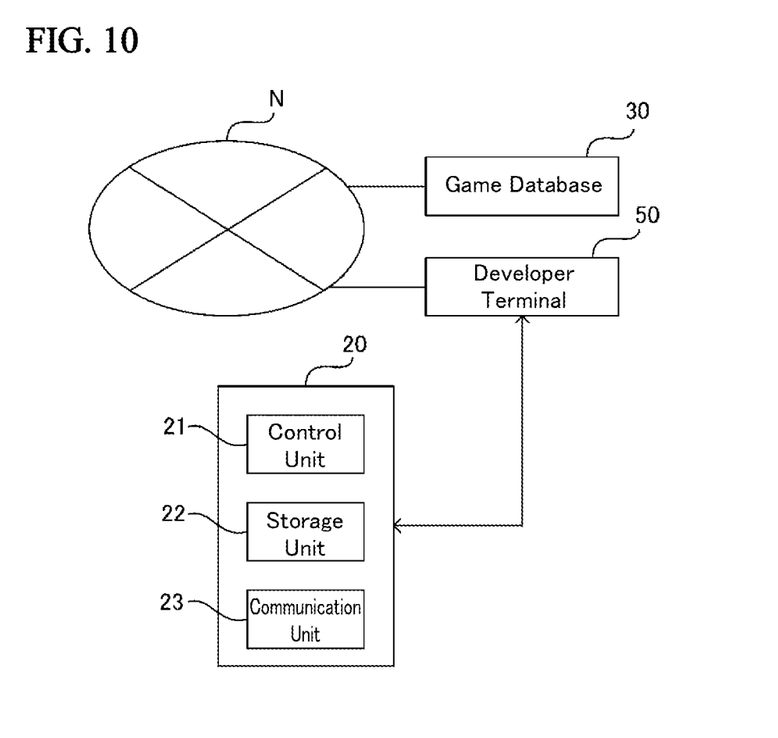
FIG. 10 is a diagram showing a system using an information processing device which functions as the server device.

FIG. 10 is a diagram showing a system using an information processing device 20 having the same function as that of the server device 10.

In the example of FIG. 10, the information processing device 20 is a device for deriving an optimal solution for the parameters to be set in a game content, and is directly connected to the developer terminal 50 without passing through the network N. The information processing device 20 is connected to the game database 30 via the developer terminal 50 and the network N. As shown in FIG. 10, the information processing device 20 includes a control unit 21 that executes various operations, a storage unit 22 that stores various programs and data, and a communication unit 23 that transmits and receives data to and from other devices. The control unit 21, the storage unit 22, and the communication unit 23 have the same functions as the control unit 11, the storage unit 12, and the communication unit 13, respectively, of the server device 10.

The information processing device 20 has the same functional configuration as the user data storage unit 110, the master data storage unit 120, the setting processing unit 130, the simulation execution unit 140, and the parameter adjustment unit 150 of the server device 10.

What is claimed is:

1. A non-transitory computer readable media storing a program therein for causing a computer to execute a processing, the processing comprising:
   executing a setting processing in which the one or more parameters are set with respect to target the new game content appearing in the game; and
   executing a simulation processing related to a predetermined battle game part using the target the new game content, for which the one or more parameters are set by the setting processing, and user data that includes information on one or more of other game contents set by a user playing the game,
   wherein an optimal solution for the one or more parameters are derived by repeatedly executing the simulation processing while changing the one or more parameters by the setting processing by way of an optimization problem that minimizes the difference between evaluation information of the target the new game content retrieved based on the execution of the simulation process and target evaluation information,
   wherein the evaluation information includes a battle result of the predetermined battle game part, and the target evaluation information includes a target battle result,
   wherein in the executing of the setting processing, a plurality of the parameters are set with respect to the target game content, a search range being set for each of the parameters, and
   wherein the optimal solution for the parameters is derived by selecting one, from among a plurality of optimal solutions that satisfy the target evaluation information, by which all the parameters are as close as possible to a center of the respective parameter search ranges.

2. The non-transitory computer readable media according to claim 1, wherein the evaluation information includes a battle win rate of the predetermined battle game part, and the target evaluation information includes a target battle win rate.

3. The non-transitory computer readable media according to claim 1, wherein in the executing of the setting processing, a search space is set by setting the one or more parameters with respect to the target game content such that the target game content is stronger than a specific existing game content and weaker than another specific existing game content.

4. The non-transitory computer readable media according to claim 1, wherein the predetermined battle game part is a battle between a deck including the target game content and one or more existing game contents and another deck including other existing game contents.

5. The non-transitory computer readable media according to claim 1, wherein in the executing of the simulation processing, the predetermined battle game part is a battle between a deck including the target game content and one or more existing game contents and a deck set by another user who is in an upper user group.

6. An information processing device comprising:
   a processor, configured to:
      execute a setting processing in which one or more parameters are set with respect to target game content appearing in a game, and
      execute a simulation processing related to a predetermined battle game part using the target game content, for which the one or more parameters are set by the setting processing, and user data that includes information on one or more of other game contents set by a user playing the game,
   wherein an optimal solution for the one or more parameters are derived by repeatedly executing the simulation processing while changing the one or more parameters by the setting processing by way of an optimization problem that minimizes the difference between evaluation information of the target game content retrieved based on the execution of the simulation process and target evaluation information,
   wherein the evaluation information includes a battle result of the predetermined battle game part, and the target evaluation information includes a target battle result,
   wherein the processor is configured to execute the setting processing by setting a plurality of the parameters with respect to the target game content, a search range being set for each of the parameters, and
   wherein the optimal solution for the parameters is derived by selecting one, from among a plurality of optimal solutions that satisfy the target evaluation information, by which all the parameters are as close as possible to a center of the respective parameter search ranges.

7. The information processing device according to claim 6, wherein the evaluation information includes a battle win rate of the predetermined battle game part, and the target evaluation information includes a target battle win rate.

8. The information processing device according to claim 6, wherein the processor is configured to execute the setting processing by setting the one or more parameters with respect to the target game content such that the target game content is stronger than a specific existing game content and weaker than another specific existing game content.

9. The information processing device according to claim 6, wherein the predetermined battle game part is a battle between a deck including the target game content and one or more existing game contents and another deck including other existing game contents.

10. The information processing device according to claim 6, wherein in the executing of the simulation processing, the predetermined battle game part is a battle between a deck including the target game content and one or more existing game contents and a deck set by another user who is in an upper user group.

11. A control method executed by an information processing device, the control method comprising:
    executing a setting processing in which one or more parameters are set with respect to target game content appearing in a game; and
    executing a simulation processing related to a predetermined battle game part using the target game content, for which the one or more parameters are set by the setting processing, and user data that includes information on one or more of other game contents set by a user playing the game,
    wherein an optimal solution for the one or more parameters are derived by repeatedly executing the simulation processing while changing the one or more parameters by the setting processing by way of an optimization problem that minimizes the difference between evaluation information of the target game content retrieved based on the execution of the simulation process and the target evaluation information,
    wherein the evaluation information includes a battle result of the predetermined battle game part, and the target evaluation information includes a target battle result, wherein in the executing of the setting processing, a plurality of the parameters are set with respect to the target game content, a search range being set for each of the parameters, and wherein the optimal solution for the parameters is derived by selecting one, from among a plurality of optimal solutions that satisfy the target evaluation information, by which all the parameters are as close as possible to a center of the respective parameter search ranges.

12. The control method according to claim 11, wherein the evaluation information includes a battle win rate of the predetermined battle game part, and the target evaluation information includes a target battle win rate.

13. The control method according to claim 11, wherein in the executing of the setting processing, a search space is set by setting the one or more parameters with respect to the target game content such that the target game content is stronger than a specific existing game content and weaker than another specific existing game content.

14. The control method according to claim 11, wherein the predetermined battle game part is a battle between a deck including the target game content and one or more existing game contents and another deck including other existing game contents.

15. The control method according to claim 11, wherein in the executing of the simulation processing, the predetermined battle game part is a battle between a deck including the target game content and one or more existing game contents and a deck set by another user who is in an upper user group.

* * * * *